United States Patent
Watanabe

(10) Patent No.: US 11,461,136 B2
(45) Date of Patent: Oct. 4, 2022

(54) SUBSTRATE PROCESSING DEVICE AND DETERMINATION METHOD

(71) Applicant: Tokyo Electron Limited, Tokyo (JP)

(72) Inventor: Ken Watanabe, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 125 days.

(21) Appl. No.: 16/971,866

(22) PCT Filed: Jun. 20, 2019

(86) PCT No.: PCT/JP2019/024455
§ 371 (c)(1),
(2) Date: Aug. 21, 2020

(87) PCT Pub. No.: WO2020/008892
PCT Pub. Date: Jan. 9, 2020

(65) Prior Publication Data
US 2021/0011763 A1    Jan. 14, 2021

(30) Foreign Application Priority Data
Jul. 3, 2018   (JP) .............................. JP2018-126903

(51) Int. Cl.
*G06F 9/46*    (2006.01)
*G06F 9/48*    (2006.01)

(52) U.S. Cl.
CPC .................................. *G06F 9/4887* (2013.01)

(58) Field of Classification Search
CPC ..................................................... G06F 9/4887
See application file for complete search history.

(56) References Cited

FOREIGN PATENT DOCUMENTS

| JP | 2003-022119 | 1/2003 |
|----|-------------|--------|
| JP | 2009-145946 | 7/2009 |
| JP | 2012-216852 | 11/2012 |
| JP | 2013-219257 | 10/2013 |

*Primary Examiner* — Gregory A Kessler
(74) *Attorney, Agent, or Firm* — IPUSA, PLLC

(57) ABSTRACT

In a substrate processing device, a technique that achieves OR transfer satisfying a specified condition is provided. The substrate processing device includes an identifying unit configured to refer to usage states of a plurality of process modules at process time slots to identify one or more process modules that can execute processes of substrates included in a control job to be processed among process modules that can be used at the process time slots, a calculating unit configured to assign the processes of the substrates to respective process time slots of the one or more process modules identified by the identifying unit to calculate a time duration from a start to an end of the processes of the substrates, and a determining unit configured to determine start timing of starting the processes of the substrates so that the time duration calculated by the calculating unit satisfies a specified condition.

8 Claims, 9 Drawing Sheets

FIG.5
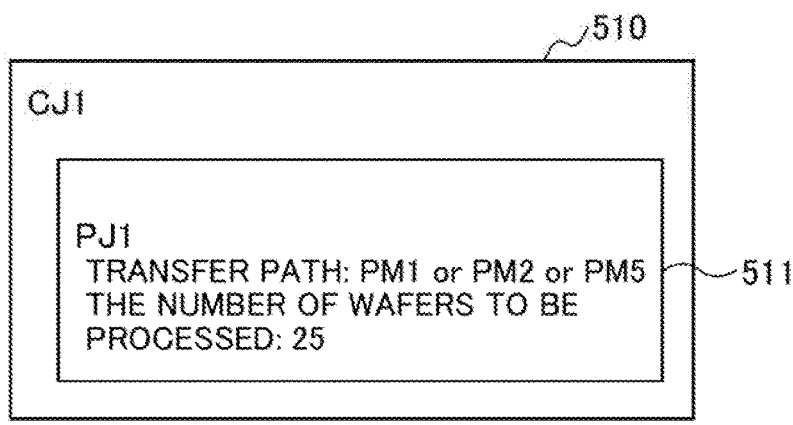
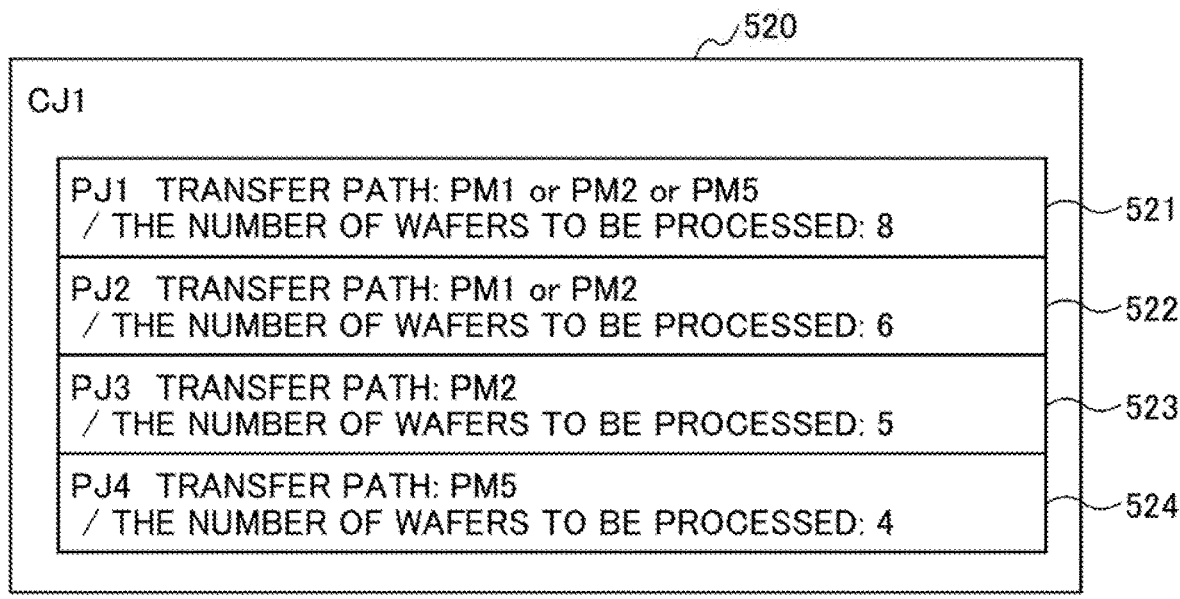

SUBSTRATE PROCESSING DEVICE AND DETERMINATION METHOD

TECHNICAL FIELD

The present disclosure relates to a substrate processing device and a determination method.

BACKGROUND

Conventionally in a substrate processing device, when multiple substrates (i.e., wafers) are processed, "OR transfer" (i.e., transfer of different wafers to different process modules) is performed and parallel processing is performed by multiple process modules, thereby improving the processing efficiency.

In the substrate processing device, when parallel processing of multiple wafers is started by the OR transfer, a usage state of each process module is referenced. When there is a process module that can be used, starting the processing of the wafer in the process module achieves an improvement of an operation rate of each process module.

With respect to the above, as a "condition" for achieving product quality of each wafer, an upper and lower limit of time-in-process (what is called "Q-time") is generally specified for the substrate processing device, and the time-in-process of each wafer in the substrate processing device is controlled.

RELATED ART DOCUMENTS

Patent Documents

[Patent Document 1] Japanese Laid-open Patent Application Publication No. 2012-216852

SUMMARY

Problem to Be Solved by the Invention

The present disclosure provides a technique that achieves OR transfer that satisfies a specified condition in a substrate processing device

Means for Solving Problem

A substrate processing device according to one aspect of the present disclosure, for example, has the following configuration. That is, the substrate processing device includes an identifying unit configured to refer to usage states of a plurality of process modules at process time slots to identify one or more process modules that can execute processes of substrates included in a control job to be processed among process modules that can be used at the process time slots, a calculating unit configured to assign the processes of the substrates to respective process time slots of the one or more process modules identified by the identifying unit to calculate a time duration from a start to an end of the processes of the substrates, and a determining unit configured to determine a start timing of starting the processes of the substrates so that the time duration calculated by the calculating unit satisfies a specified condition.

Effect of Invention

According to the present disclosure, a technique that achieves OR transfer that satisfies a specified condition in a substrate processing device can be provided in a substrate processing device.

BRIEF DESCRIPTION OF THE DRAWINGS

FIG. 5 is a drawing illustrating an example of generating a PJ and a CJ;

DESCRIPTION OF EMBODIMENTS

Figure 1:
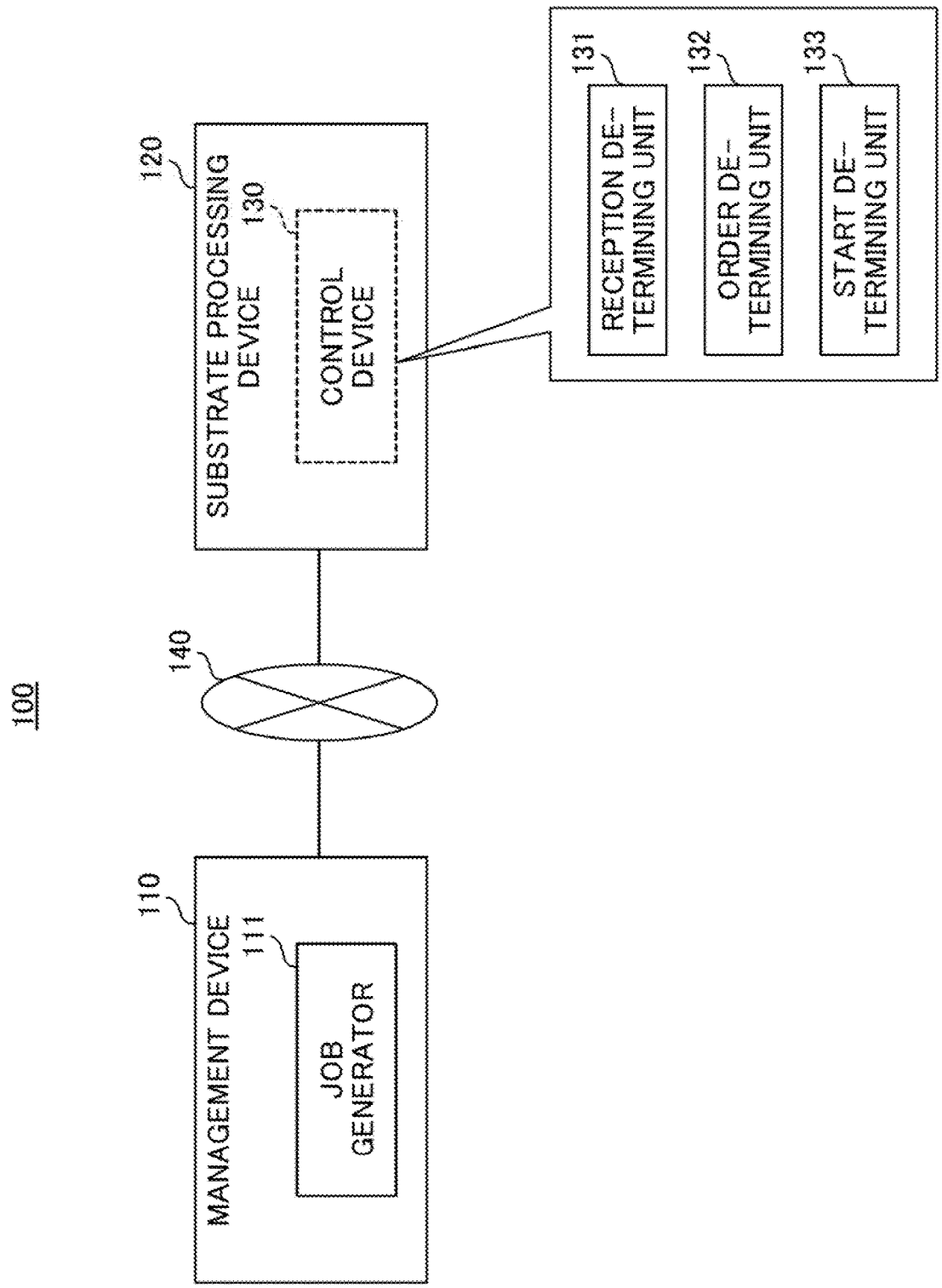
FIG. 1 is a drawing illustrating an example of an entire configuration of a substrate processing system.

In the following, the details of each embodiment will be described with reference to the accompanying drawings. In the present specification and the drawings, components having substantially the same functional configuration are referenced by the same reference numerals, and overlapping description is omitted.

First Embodiment

<Entire Configuration of a Substrate Processing System>

First, an entire configuration of a substrate processing system including a substrate processing device according to a first embodiment will be described. FIG. 1 is a drawing illustrating an example of the entire configuration of the substrate processing system. As illustrated in FIG. 1, a substrate processing system 100 includes a management device 110 and a substrate processing device 120. In the substrate processing system 100, the management device 110 and the substrate processing device 120 are communicatively connected through a network 140.

The management device 110 is a device for managing the substrate processing device 120 and includes a job generator 111. The job generator 111 generates a job representing a processing unit of a process performed by the substrate processing device 120 on a substrate (i.e., "a wafer") and sends the job to the substrate processing device 120.

The job generated by the job generator 111 includes a process job ("PJ") that is a processing unit corresponding to a wafer group ("a lot") on which the same processing content is performed.

The job generated by the job generator 111 includes a control job ("CJ") that corresponds to multiple wafer groups stored in one hoop (which will be described later in detail) in the substrate processing device 120 and that is a processing unit group including multiple PJs.

When a job is generated, the job generator 111 receives a specification of Q-time. The Q-time indicates an upper limit and a lower limit of "time-in-process" specified as a condition for achieving product quality for the substrate processing device 120 to process the wafer.

Here, the time-in-process indicates time from a start to an end of processes of wafers per CJ Specifically, when one CJ includes multiple PJs, the time-in-process indicates time from when a first wafer included in a first PJ is transferred from a hoop to when a last wafer included in a last PJ returns to the hoop, for each wafer included in the one CJ. When one CJ includes only one PJ, the time-in-process indicates time from when a first wafer is transferred from the hoop to when a last wafer returns to the hoop, for each wafer included in the one PJ.

The substrate processing device 120 is a device having multiple process modules (i.e., "PMs") that perform processing on wafers included in the CJ The substrate processing device 120 includes components (which are not illustrated in FIG. 1) including the multiple PMs and a control device 130 for controlling each component.

In the present embodiment, a determining program including a reception determining program, an order determining program, and a start determining program is installed in the control device 130. By the determination program being executed, the control device 130 functions as a reception determining unit 131, an order determining unit 132, and a start determining unit 133.

The reception determining unit 131 determines whether the time-in-process of the CJ generated in the job generator 111 exceeds the specified Q-time. At this time, the reception determining unit 131 calculates the time-in-process when the processes of the wafers included in the CJ are executed using all PMs that can execute the process, and performs a determination.

When the reception determining unit 131 determines that the time-in-process of the CJ generated in the job generator 111 exceeds the specified Q-time, the reception determining unit 131 determines that the job generated in the job generator 111 cannot be received and rejects a reception.

When the reception determining unit 131 determines that the time-in-process of the CJ generated in the job generator 111 does not exceed the specified Q-time, the reception determining unit 131 determines that the CJ generated in the job generator 111 can be received and permits a reception.

The order determining unit 132 reorders the multiple PJs in the CJ and determines the execution order when the reception determining unit 131 permits the reception of the CJ and when the multiple PJs are included in the CJ received by the reception determining unit 131.

The start determining unit 133 determines a timing of starting the processes of the wafers included in the CJ to be processed of which reception is permitted by the reception determining unit 131 while referring to usage states of the PMs. Specifically, the start determining unit 133 functions as an identifying unit and identifies a PM that can be used and that can execute the processes of the wafers included in the CJ to be processed, based on the usage states of the multiple PMs included in the substrate processing device 120. Here, the usage state of the PM indicates a state at each process time slot of the PM being used or to be used for processing each wafer included in another CJ.

The start determining unit 133 functions as a calculating unit and calculates the time-in-process by assigning the processes of the wafers included in the CJ to be processed to respective process time slots of the identified PM. As described above, the start determining unit 133 calculates the time-in-process considering the usage states of the PMs when the processing is started for each wafer included in the CJ to be processed.

Further, the start determining unit 133 functions as a determining unit and determines a start timing to start the processes of the wafers included in the CJ to be processed so that the calculated time-in-process does not exceed the Q-time. Thus, according to the substrate processing device 120, it is possible to achieve the OR transfer that does not exceed the Q-time.

<Configuration of Each Component of the Substrate Processing Device>

Figure 2:
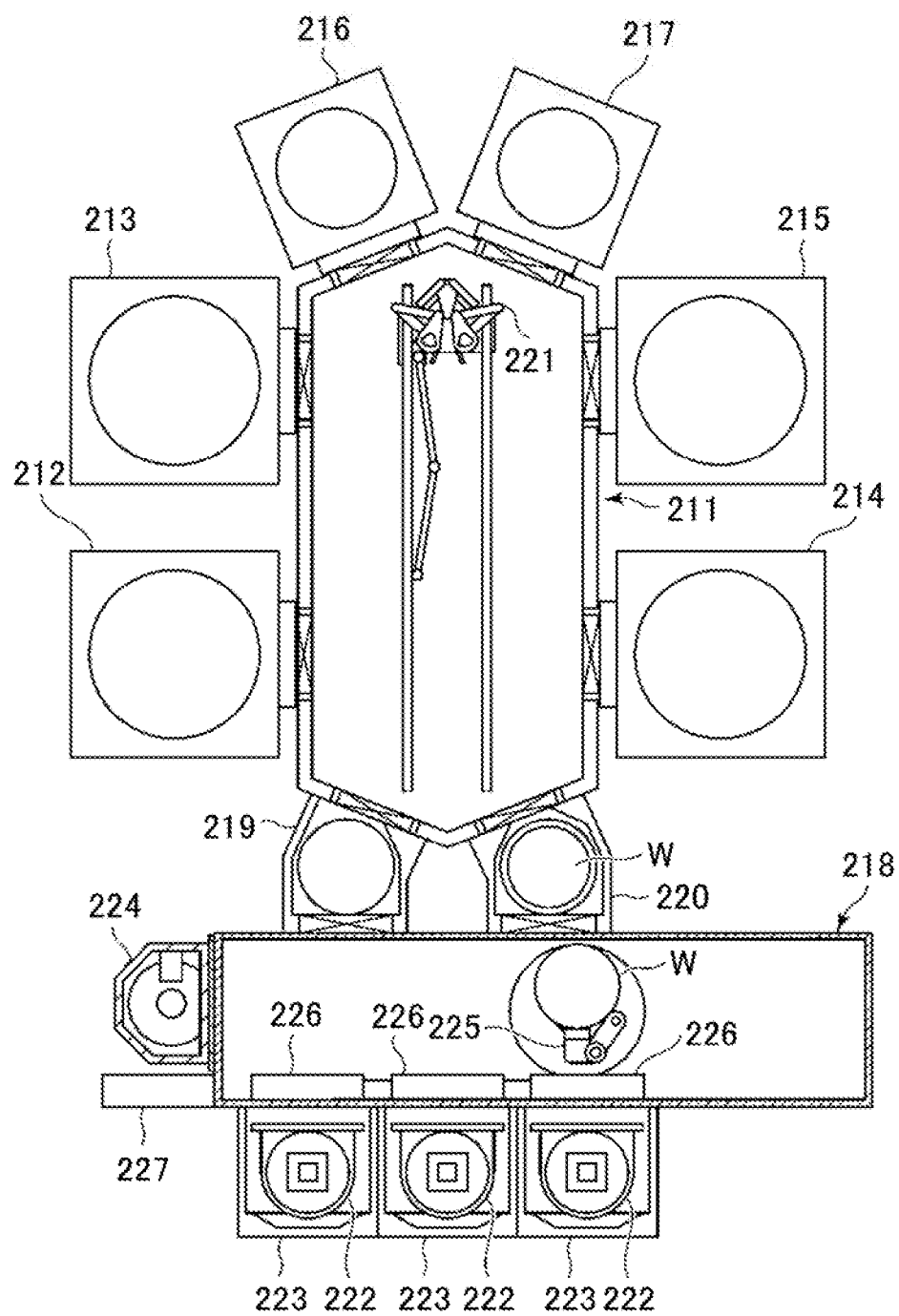
FIG. 2 is a drawing illustrating an example of each component included in a substrate processing device.

Next, each component of the substrate processing device 120 will be described. FIG. 2 is a drawing illustrating an example of each component included in the substrate processing device.

As illustrated in FIG. 2, the substrate processing device 120 includes a hexagonal transfer module ("TM") 211 in planar view and two PMs 212 and 213 coupled to one side of the TM 211.

The substrate processing device 120 also includes two PMs 214 and 215 coupled to the other side of the TM 211 so as to face two PMs 212 and 213.

The substrate processing device 120 also includes a PM 216 that is adjacent to the PM 213 and that is coupled to the TM 211, and a PM 217 that is adjacent to the PM 215 and that is coupled to the TM211. The substrate processing device 120 further includes a loader module ("LM") 218 as a rectangular transfer chamber and two load lock modules ("LLM") 219 and 220 that are disposed between the TM 211 and the LM 218 and that connect the TM 211 and the LM 218.

The TM 211 includes a transfer arm 221 that can be freely bended, stretched, and pivoted and that is disposed inside, and the transfer arm 221 transfers a wafer W among the PMs 212 to 217 and the LLMs 219 and 220.

Each of the PMs 212 to 217 accommodates the wafer W inside and applies plasma processing, such as dry etching, to the wafer W using plasma generated by excitation of processing gas inside.

The inside of the TM 211 and the PMs 212 to 217 is maintained in a reduced pressure state and each of the TM 211 and the PMs 212 to 217 is connected through a vacuum gate valve.

In the substrate processing device 120, while an inner pressure of the LM 218 is maintained at atmospheric pressure, an inner pressure of the TM 211 is maintained at vacuum. Thus, each of the LLMs 219 and 220 is configured as a vacuum auxiliary transfer chamber that can adjust, an inner pressure by providing a vacuum gate valve at a connection between each of the LLMs 219 and 220 and the TM 211 and providing an atmospheric door valve at a connection between each of the LLMs 219 and 220 and the LM 218.

In addition to the LLMs 219 and 220, for example, the LM 218 is coupled to three hoop pedestals 223, in which, for example, hoops 222 each accommodating 25 wafers W are placed. Further, the LM 218 is coupled to an orienter 224 for pre-aligning a position of the wafer W transferred from the hoop 222.

The LLMs 219 and 220 are coupled to a sidewall along a longitudinal direction of the LM 218 and disposed so as to face the three hoop pedestals 223 across the LM 218. The orienter 224 is disposed at one end of the LM 218 in the longitudinal direction.

The LM 218 includes a SCARA dual-arm type transfer arm 225 disposed inside for transferring the wafer W and three load ports 226, which are disposed on a sidewall, corresponding to respective hoop pedestals 223 as input ports for the wafer W.

The transfer arm 225 takes the wafer W from the hoop 222 placed on the hoop pedestal 223 through the load port 226 and carries the taken wafer W into and out of the LLM 219 and 220, and the orienter 224.

The substrate processing device 120 includes an operation panel 227 disposed at one end of the LM 218 in the longitudinal direction. The operation panel 227 includes, for example, a display unit and displays an operating state of each component controlled by the control device 130 (which is not illustrated in FIG. 2) of the substrate processing device 120.

<Hardware Configuration of the Control Device>

Figure 3:
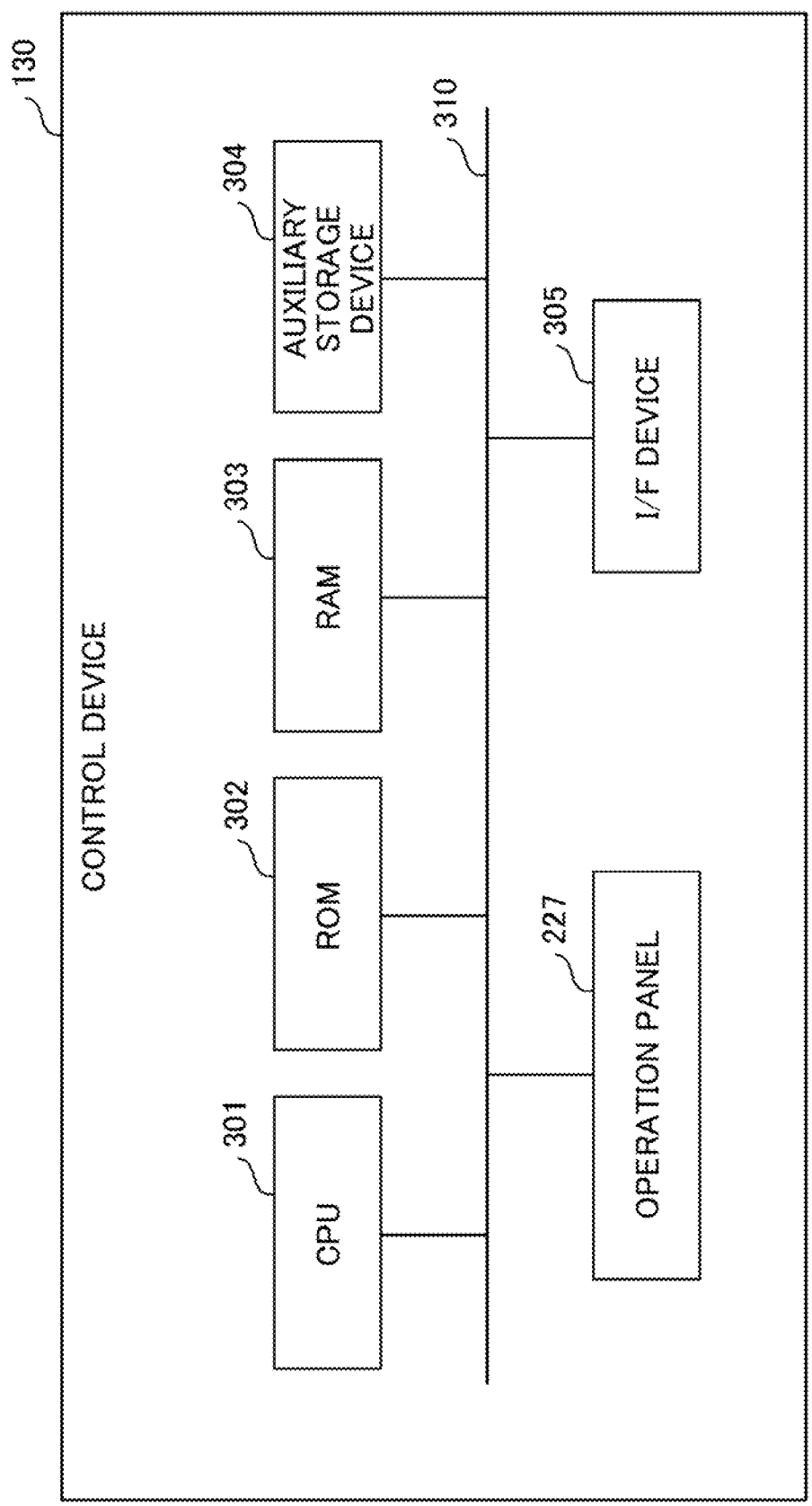
FIG. 3 is a drawing illustrating an example of a hardware configuration of a control device.

Next, a hardware configuration of the control device 130 will be described. FIG. 3 is a drawing illustrating an example of the hardware configuration of the control device. As illustrated in FIG. 3, the control device 130 includes a central processing unit (CPU) 301, a read only memory (ROM) 302, and a random access memory (RAM) 303. The CPU 301, the ROM 302, and the RAM 303 form what is called a computer.

The control device 130 also includes an auxiliary storage device 304, the operation panel 227, and an interface (I/F) device 305. Each hardware of the control device 130 is interconnected to each other through a bus 310.

The CPU 301 is an arithmetic device that executes various programs installed in the auxiliary storage device 304 (e.g., the determining program (the reception determining program, the order determining program, and a start determining program)).

The ROM 302 is a non-volatile memory. The ROM 302 functions as a main storage device that stores various programs and data required for the CPU 301 to execute various programs installed in the auxiliary storage device 304. Specifically, the ROM 302 functions as a main storage device for storing, for example, a boot program, such as Basic Input/Output System (BIOS) and Extensible Firmware Interface (EFI).

The RAM 303 is a volatile memory, such as a dynamic random access memory (DRAM) or a static random access memory (SRAM). The RAM 303 functions as a main storage device that provides a workspace in which various programs installed in the auxiliary storage device 304 are deployed when various programs are executed by the CPU 301.

The auxiliary storage device 304 is an auxiliary storage device that stores various programs and information generated by various programs being executed.

The operation panel 227 displays an operating state of each component of the substrate processing device 120 on the display unit. The I/F device 305 is a connection device that connects each component in the substrate processing device 120 to each other to communicate with each other.

<Process Flow in the Substrate Processing System>

Figure 4:
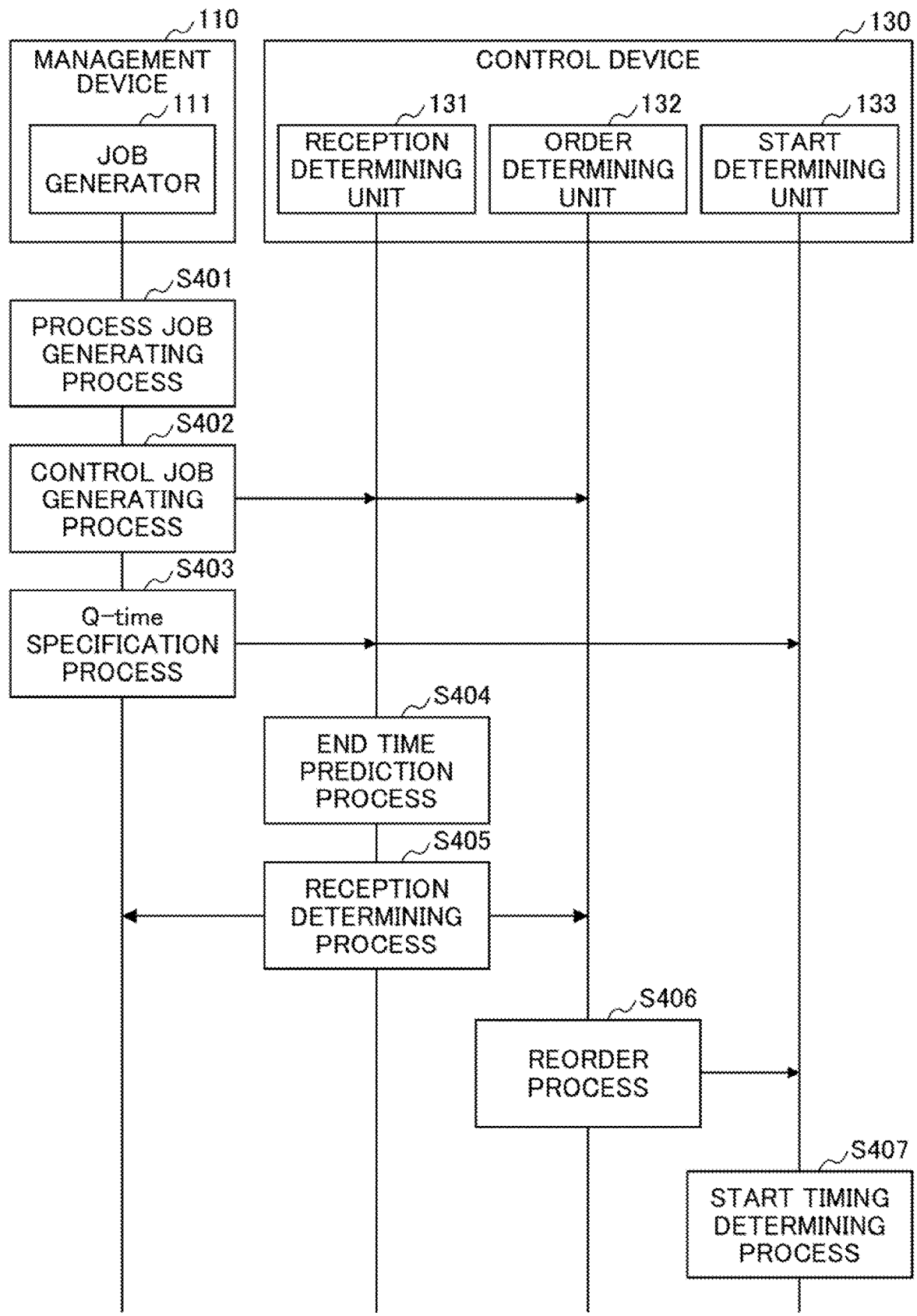
FIG. 4 is a sequence diagram illustrating a process flow in the substrate processing system.

Next, in a process in the substrate processing system 100, a flow from PJ generation in the management device 110 to start timing determination of the processes of the wafers in the control device 130 will be described. FIG. 4 is a sequence diagram illustrating a process flow in the substrate processing system. Each time the CJ is generated, the substrate processing system 100 performs a process illustrated in FIG. 4 and determines the start timing to start the processes of the wafers included in the CJ.

In step S401, the job generator 111 of the management device 110 performs a process job generating process to generate the PJ.

In step S402, the job generator 111 of the management device 110 performs a control job generating process to generate the CJ including the PJ, and send the CJ to the control device 130.

In step S403, the job generator 111 of the management device 110 executes a Q-time specification process, receives the specified Q-time, and send the specified Q-time to the control device 130.

In step S404, the reception determining unit 131 of the control device 130 performs an end time prediction process. Specifically, the reception determining unit 131 calculates the time-in-process of the CJ sent from the control device 130 and predicts time when the processes of the wafers included in the CJ end (i.e., predicted end time).

In step S405, the reception determining unit 131 of the control device 130 performs a reception determining process. Specifically, the reception determining unit 131 compares the predicted end time predicted in step S404 with allowable end time calculated from the Q-time sent from the job generator 111 of the management device 110, and determines whether the CJ can be received.

The reception determining unit 131 sends a determined result of whether the CJ can be received to the management device 110. Further, when the reception determining unit 131 determines that the CJ can be received, the reception determining unit 131 sends the determined result to the order determining unit 132.

In step S406, the order determining unit 132 performs a reorder process. Specifically, the order determining unit 132 determines whether multiple PJs are included in the CJ, and when the order determining unit 132 determines that multiple PJs are included, the order determining unit 132 reorders the multiple PJs included in the CJ and determines execution order. The order determining unit 132 sends the CJ including the multiple PJs reordered in the determined execution order to the start determining unit 133.

In step S407, the start determining unit 133 performs a start timing determining process. Specifically, the start determining unit 133 refers to the usage states of multiple PMs included in the substrate processing device 120. Additionally, the start determining unit 133 assigns the processes of the wafers included in the CJ to respective process time slots of the PM that can be used and that can execute the processes of the wafers included in the CJ to calculate the time-in-process when a current process timing is used as the start timing. Further, when the start determining unit 133 determines that the calculated time-in-process does not exceed the Q-time, the start determining unit 133 determines the current process timing to be the start timing of starting the processes of the wafers included in the CJ, and starts the processes of the wafers included in the CJ.

<Specific Example of Each Process in the Substrate Processing System>

Next, among the processes illustrated in FIG. 4, specific examples of the following processes will be described.

step S401 and step S402 (the process job generating process and the control job generating process)

step S404 (the end time prediction process)

step S406 (the reorder process)

step S407 (the start timing determining process)

(1) Specific examples of step S401 and step S402 (the process job generating process and the control job generating process)

First, specific examples of step S401 and step S402 (the process job generating process and the control job generating process) will be described. FIG. 5 is a drawing illustrating a specific example of generating the PJ and the CJ.

In FIG. 5, a CJ 510 (the job name="CJ1") is an example of the CJ including one PJ 511 (job name="PJ1"). As illustrated in FIG. 5, the PJ 511 included in the CJ 510 can perform the processes of the wafers in any of three PMs (the module names="PM1", "PM2", and "PM5"). In the example illustrated in FIG. 5, the PJ 511 included in the CJ 510 indicates that the number of wafers per lot is 25.

With respect to the above, in FIG. 5, a CJ 520 (the job name="CJ1") is an example of the CJ including multiple PJs 521 to 524 (the job name="PJ1", "PJ2", "P J3", and "PJ4").

As illustrated in FIG. 5, the PJ 521 included in the CJ 520 can perform the processes of the wafers in any of three PMs (the module names="PM1", "PM2", and "PM5"). In the example illustrated in FIG. 5, the PJ 521 included in the CJ 520 indicates that the number of wafers per lot is eight.

As illustrated in FIG. 5, the PJ 522 (the job name="PJ2") included in the CJ 520 can perform the processes of the wafers in either of two PMs (the module name="PM1" and "PM2"), In the example illustrated in FIG. 5, the PJ 522 (the job name="PJ2") included in the CJ 520 indicates that the number of wafers per lot is six.

As illustrated in FIG. 5, the PJ 523 (the job name="PJ3") included in the CJ 520 can perform the processes of the wafers in only one PM (the module name="PM2"). In the example illustrated in FIG. 5, the PJ 523 (the job name="PJ3") included in the CJ 520 indicates that the number of wafers per lot is five.

As illustrated in FIG. 5, the PJ 524 (the job name="PJ4") included in the CJ 520 can perform the processes of the wafers in only one PM (the module name="PM5"), In the example of FIG. 5, the PJ 524 (the job name="PJ4") included in the CJ 520 indicates that the number of wafers per lot is four.

(2) Specific Example of Step S404 (the End Time Prediction Process)

Figure 6:
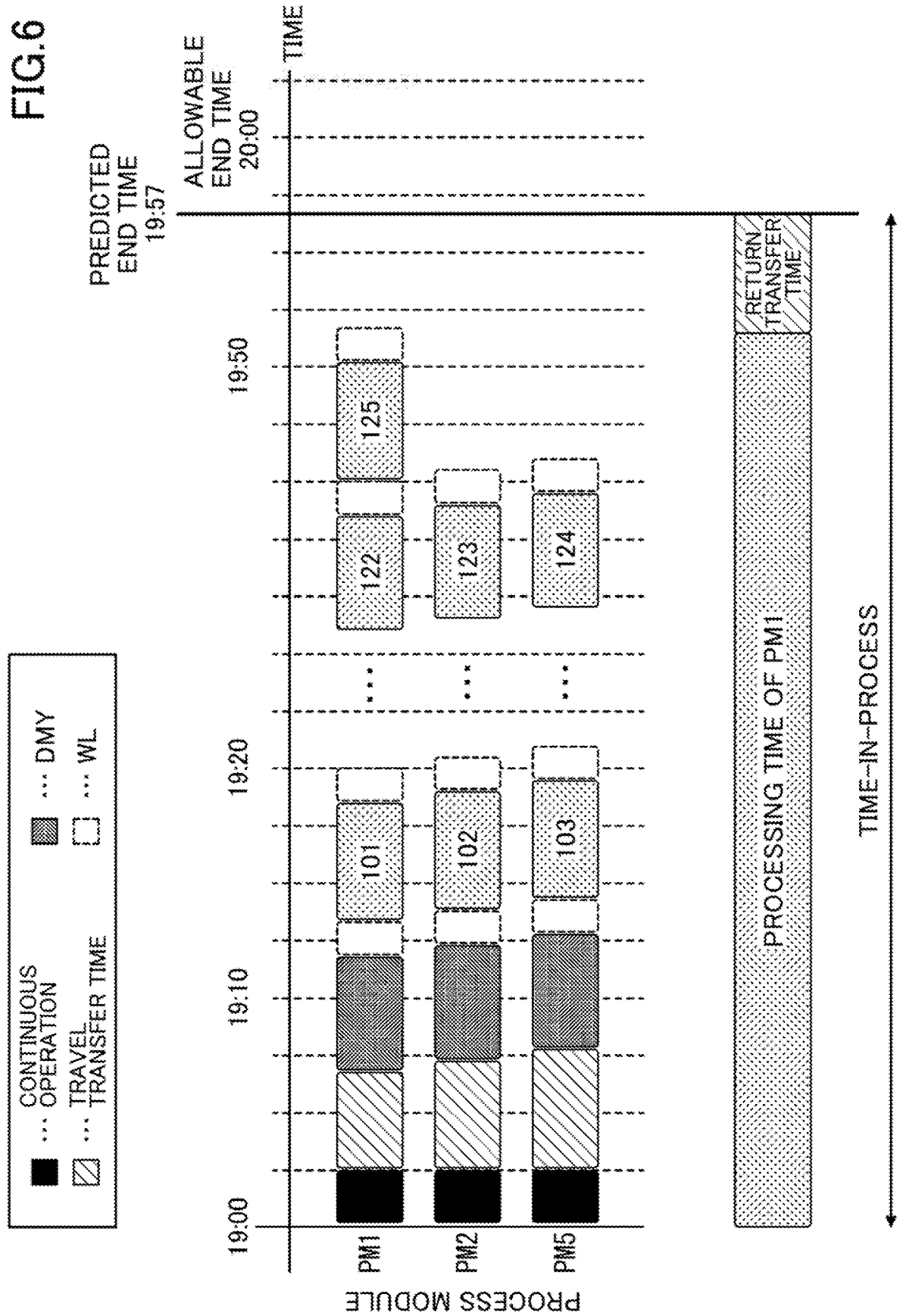
FIG. 6 is a drawing illustrating a specific example of an end time prediction process.

Next, a specific example of step S404 (the end time prediction process) performed by the reception determining unit 131 of the control device 130 will be described. FIG. 6 is a drawing illustrating a specific example of the end time prediction process. For the purpose of simplicity of the description, the CJ 510, which is a CJ including only one PJ, will be described as a CJ to be processed.

In FIG. 6, the horizontal axis represents time and the vertical axis represents PMs (the module names="PM1", "PM2", and "PM5"), in which the processes of the wafers included in the PJ 511 (the job name="PJ1") included in the CJ 510 can be performed.

As illustrated in FIG. 6, 25 wafers (i.e., "101" to "125") included in the PJ 511 (the job name="JP1") included in the CJ 510 are sequentially assigned to respective process time slots of PMs (the module names="PM1", "PM2", and "PM5").

The processing time of a wafer in each PM (the module name="PM1", "PM2", or "PM5") is generated by prediction based on, for example, recipe result time, recipe remaining time, and transfer time. In FIG. 6, "continuous operation" represents preparation time for transferring the wafer. "Travel transfer time" represents a time duration in which the wafer is transferred from the hoop 222 to each PM (the module name="PM1", "PM2", or "PM5").

"DMY" represents a time duration in which a dummy wafer is processed before a wafer is processed in each PM (the module name="PM1", "PM2", or "PM5"). Further, "WL" represents a time duration in which dry cleaning is performed in a state of having no wafer in each PM (the module name="PM1", "PM2", or "PM5").

In the example of FIG. 6, a time duration calculated by adding "return transfer time"(i.e., a time duration in which the wafer is transferred from the PM whose module name is "PM1" to the hoop 222) to the processing time of wafers in the PM (the module name="PM1"), which is the longest, is the time-in-process.

The example in FIG. 6 illustrates a state in which time at which the processes of the wafers included in the PJ 511 is started is "19:00", and the predicted end time is predicted to be "19:57". As illustrated in FIG. 6, if the allowable end time calculated from the Q-time is "20:00", the reception determining unit 131 determines that the CJ 510 can be received.

(3) Specific Example of Step S406 (the Reorder Process)

Figure 7:
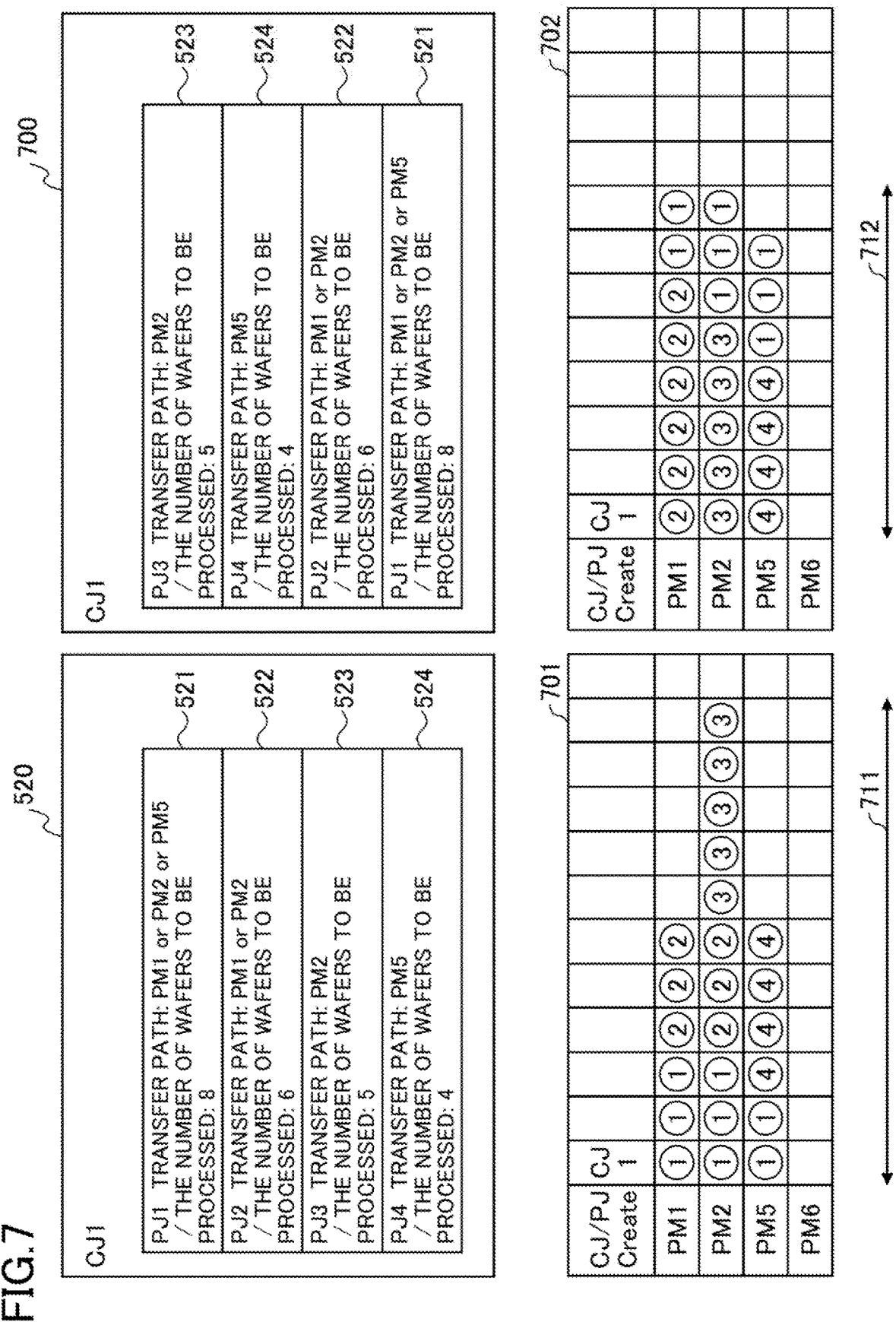
FIG. 7 is a drawing illustrating a specific example of a reorder process.

Next, a specific example of step S406 (the reorder process) by the order determining unit 132 of the control device 130 will be described. FIG. 7 is a drawing Illustrating the specific example of the reorder process, and illustrates a state in which the reorder process is performed on multiple PJs (the job name="PJ1", "PJ2", "PJ3", and "PJ4") of the CJ 520.

As illustrated in FIG. 7, in the CJ 520, multiple PJs 521 to 524 are arranged in the order of the PJ 521 (the job name="PJ1"), the PJ 522 (the job name="PJ2"), the PJ 523 (the job name="PJ3") and the PJ 524 (the job name="PJ4"). In this case the processes of the wafers included in the CJ 520 (23 wafers in total) will be executed in the execution order illustrated in a schedule 701 (squares in the schedule 701 represent the process time slots of the wafers).

As a result, in the CJ 520, the time-in-process of wafers included in CJ 520 (23 wafers in total) is time indicated by an arrow 711.

With respect to the above, when the reorder process (step S406) is performed by the order determining unit 132, the multiple PJs 521 to 524 are reordered in the order illustrated in a CJ 700. Specifically, the multiple PJs 521 to 524 will be reordered in the order of the PJ 523 (the job name="PJ3"), the PJ 524 (the job name="PJ4"), the PJ 522 (the job name="PJ2"), and the PJ 521 (the job name="PJ1").

The order determining unit 132 reorders multiple PJs 521 to 524 according to the following order.

- The order from the smallest number of PMs that can be executed in parallel (i.e., the order from the smallest number of ORs)
- The order from the largest number of wafers when the number of ORs is identical
- The generating order of the PJ when the number of ORs is identical and the number of wafers is identical The PJs 521 to 524 included in the CJ 520 are reordered in the order illustrated in the CJ 700 in FIG. 7, so that the processes of the wafers included in the CJ 700 (23 wafers in total) are executed in the order illustrated in a schedule 702. As a result, in the CJ 700, the time-in-process of the wafers included in the CJ 700 (23 wafers in total) is time indicated by an arrow 712.

As described above, in the CJ including multiple PJs, the time-in-process of the CJ can be reduced by reordering the multiple PJs based on the above-described step and determining the execution order.

(4) Specific Example of Step S407 (the Start Timing Determining Process)

Figure 8:
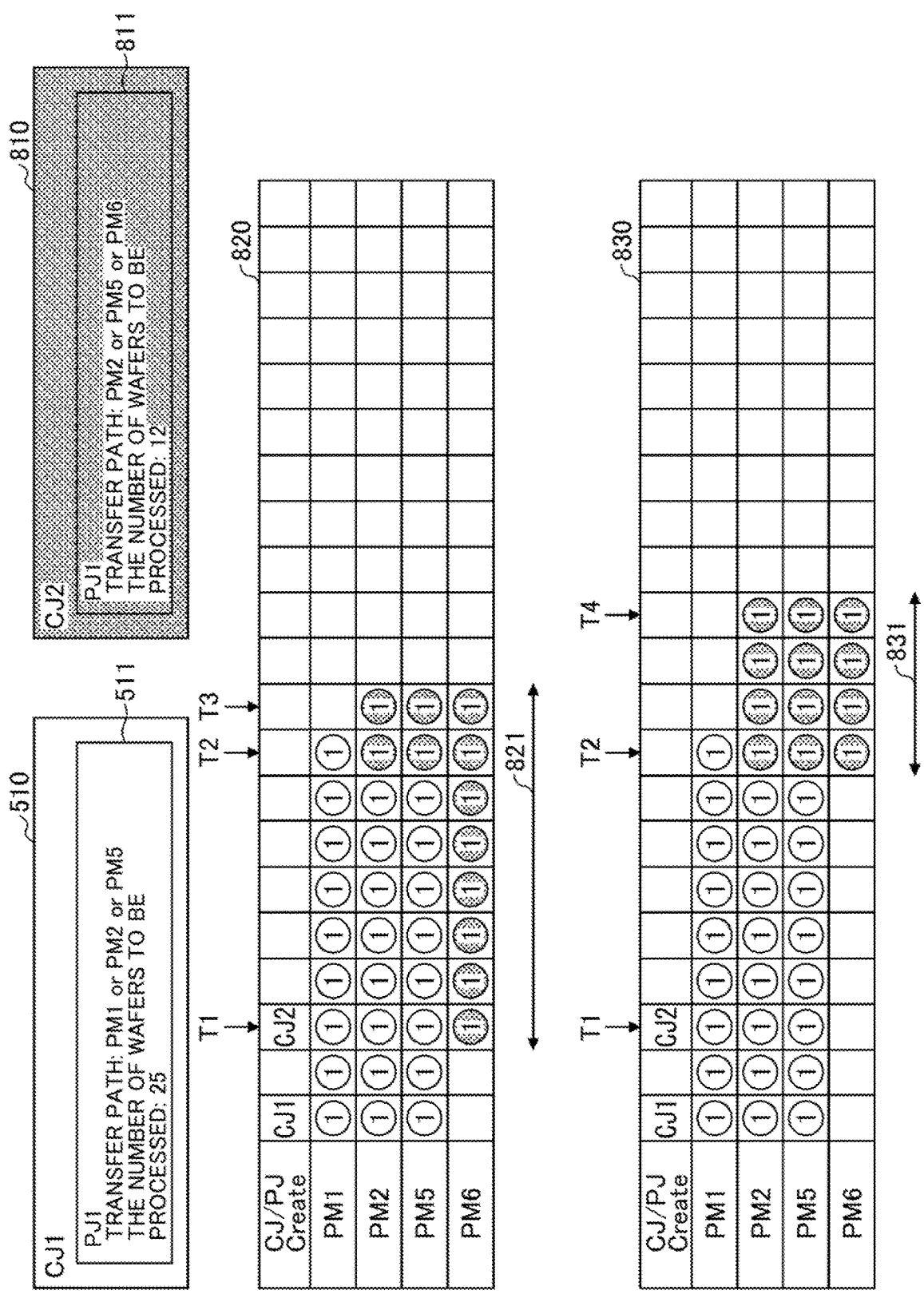
FIG. 8 is a drawing illustrating a specific example of a start timing determining process.

Next, a specific example of step S407 (the start timing determining process) by the start determining unit 133 of the control device 130 will be described. FIG. 8 is a drawing illustrating a specific example of the start timing determining process.

The example of FIG. 8 indicates a case in which the processes of the wafers (i.e., 25 wafers) included in the PJ 511 included in the CJ 510 (the job name="CJ1") are being performed. The example of FIG. 8 also indicates a state in which a CJ 810 (the job name="CJ2") is newly generated and the start timing determining process (step S407) is performed. The CJ 810 includes one PJ 811 (the job name="PJ1"), and the PJ 811 indicates that the PJ 811 can perform the processes of the wafers in any of three PMs (the module names="PM2", "PM5", and "PM6"). The PJ 811 also indicates that the number of wafers per lot is 12.

Based on the assumption above, a schedule in which the processes of the wafers included in the CJ 810 are assigned is illustrated in FIG. 8.

Here, among two schedules illustrated in FIG. 8, a schedule 820 indicates a schedule when a typical start method is applied to start the processes of the wafers included in the CJ 810 at a timing when the CJ 810 is generated, As described above, the PJ 811 can perform the processes of the wafers in any of three PMs (the module names="PM2", "PM5", and "PM6"). With respect to this, when the usage state of each PM is referenced at the timing when the CJ 810 has been generated, only the PM whose module name is "PM6" can be used.

Thus, according to the schedule 820, at the timing when the CJ 810 has been generated (T1), the processes of the wafers performed by the PM whose module name is "PM6" is started. Subsequently, the processes of the wafers included in the CJ 510 are completed, and PMs whose module names are "PM2" and "PM5" becomes available (see a timing (T2)). Thus, at the timing (T2), the PMs are used for the processes of the wafers included in the CJ 810.

As a result, as of the timing (T2), the wafers included in the CJ 810 are processed in parallel by three PMs (the module name="PM2", "PM3", and "PM6"). Subsequently, at a timing (T3), the processes of the wafers included in the CJ 810 are completed.

Thus, according to the schedule 820, the time-in-process of the CJ 810 (i.e., a time duration from the timing (T1) when the processes start to the timing (T3) when the processes end) is a time duration indicated by an arrow 821.

With respect to the above, a schedule 830 indicates a schedule to which a start method of starting the processes of the wafers included in the CJ 810 at the start timing determined by the start timing determining process is applied.

As described above, the PJ 811 can perform the processes of the wafers in any of three PMs (the module name="PM2", "PM5", and "PM6"). When the usage states of PMs at the timing (T1) when the CJ 810 has been generated are referenced, a PM that can be used is only the PM whose module name is "PM6".

Thus, if the processes are started by the PM whose module name is "PM6" at the timing (T1) when the CJ 810 has been generated, the time-in-process increases, and the predicted end time exceeds the allowable end time based on the Q-time. Therefore, the start determining unit 133 determines a start timing of the processes so that the predicted end time does not exceed the allowable end time based on the Q-time.

The schedule 830 of FIG. 8 indicates that it is determined that the predicted end time does not exceed the allowable end time based on the Q-time by starting the processes of the wafers included in the CJ 810 at the timing (T2). As described above, the timing (T2) is a timing when the processes of wafers included in the CJ 510 have been completed. That is, the timing (T2) is a timing when the PMs whose module names "PM2" and "PM5" are no longer used for the processes of the wafers included in the CJ 510.

Therefore, as illustrated in the schedule 830 of FIG. 8, as of the timing (T2), the wafers included in the CJ 810 can be processed in parallel by three PMs (the module name="PM2", "PM3", and "PM6"). As a result, the processes of the wafers included in the CJ 810 can be completed at a timing (T4).

As described above, according to the schedule 830, the time-in-process of the CJ 810 can be reduced to the time indicated by an arrow 831 (a time duration from the timing (T2) when the processes start to the timing (T4) when the processes end).

As a result, according to the start method illustrated in the schedule 830, the processes of the wafers can be completed without the predicted end time exceeding the allowable end time based on the Q-time.

<Flow of a Control Process in the Control Device>

Figure 9:
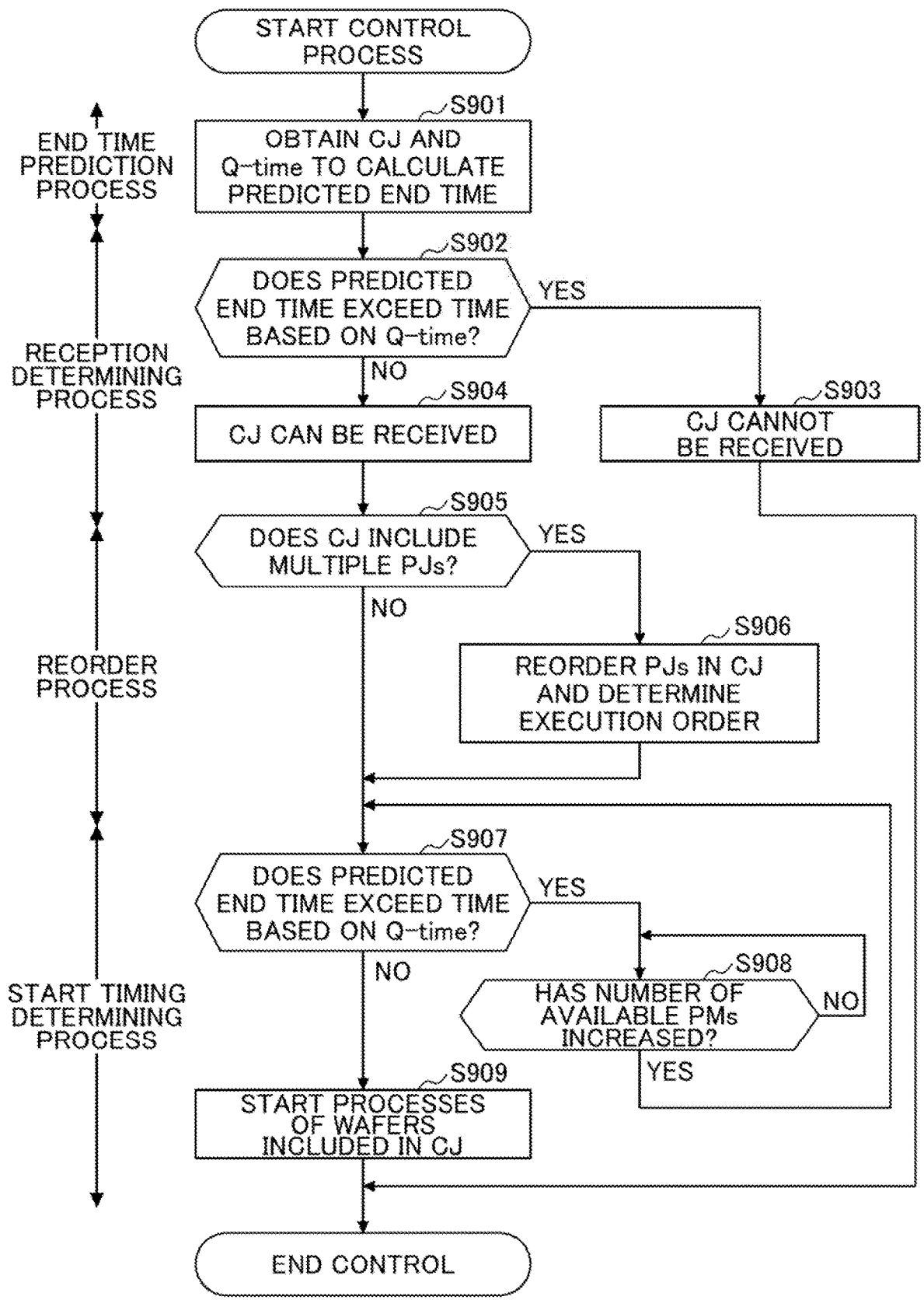
FIG. 9 is a flowchart illustrating a control process flow of the control device.

Next, a flow of a control process by the control device 130 will be described. FIG. 9 is a flowchart illustrating the flow of the control process by the control device and is illustrated in comparison with the sequence diagram illustrated in FIG. 4. In response to a start of the determining program installed in the control device 130, the flowchart illustrated in FIG. 9 is started.

First, in the control device 130, the end time prediction process is performed by the reception determining unit 131. Specifically, in step S901, the reception determining unit 131 obtains the CJ and the Q-time from the job generator 111 of the management device 110. The reception determining unit 131 predicts the predicted end time based on the obtained CJ.

Subsequently, in the control device 130, the reception determining process is performed by the reception determining unit 131. Specifically, in step S902, the reception determining unit 131 determines whether the calculated predicted end time exceeds the allowable end time based on the Q-time (i.e., whether a specified condition for achieving product quality is satisfied).

In step S902, when it is determined that the allowable end time based on the Q-time is exceeded (i.e., YES in step S902), the process proceeds to step S903. In step S903, the reception determining unit 131 determines that, the CJ cannot be received and notifies the determined result to the job generator 111 of the management device 110. In this case, the control device 130 ends the control process of the CJ and the Q-time obtained from the job generator 111 of the management device 110.

In step S902, when it is determined that the allowable end time based on the Q-time is not exceeded (i.e., NO in step S902), the process proceeds to step S904. In step S904, the reception determining unit 131 determines that the CJ can be received and notifies the determined result to the job generator 111 of the management device 110.

Subsequently, in the control device 130, the reorder process is performed by the order determining unit 132. Specifically, in step S905, the order determining unit 132 determines whether the obtained CJ includes multiple PJs.

In step S905, when it is determined that the obtained CJ includes only one PJ (i.e., NO in step S905), the process proceeds to step S907.

In step S905, when it is determined that the obtained CJ includes multiple PJs (i.e., YES in step S905), the process proceeds to step S906.

In step S906, the order determining unit 132 reorders multiple PJs included in the obtained CJ and determines the execution order of the PJs.

Subsequently, in the controller 130, the start timing determining process is performed by the start determining unit 133. Specifically, in step S907, by referring to the current PM usage state, the start determining unit 133 determines whether the predicted end time when the processes of the wafers included in the CJ are started at the current process timing exceeds the allowable end time based on the Q-time.

In step S907, when it is determined that the predicted end time exceeds the allowable end time (i.e., YES in step S907), the process proceeds to step S908. In step S908, the start determining unit 133 determines whether the number of PMs that can be used at a current process timing has increased.

In step S908, when it is determined that the number of PMs that can be used has not increased (i.e., No in step S908), the process waits until it is determined that the number of PMs that can be used has increased. In step S908, when it is determined that the number of PMs that can be used has increased (i.e., YES in step S908), the process returns to step S907.

Then, again in step S907, it is determined whether the predicted end time when the processes of the wafers included in the CJ are started at a current process timing exceeds the allowable end time based on the Q-time. In step S907, when it is determined that the predicted end time does not exceed the allowable end time (i.e., NO in step S907), the process proceeds to step SS09.

In step S909, the start determining unit 133 determines the current process timing to be the start timing of starting the processes of the wafers included in the CJ and starts the processes of the wafers included in the CJ. When the processes of the wafers included in the CJ are started, the control device 130 ends the control process of the CJ and the Q-time obtained from the job generator 111 of the management device 110.

SUMMARY

As is clear from the description above, when the substrate processing device 120 obtains the CJ and the Q-time from the management device 110, the substrate processing device 120 performs the following.

Refer to the usage states of the multiple PMs at process time slots to identify one or more PMs that can process the wafers included in the obtained CJ among the PMs that can be used at the process time slots Assign the processes of the wafers included in the CJ to respective time slots of the identified one or more PMs by using a current process timing as a start timing, and calculate the time-in-process Determine whether the predicted end time based on the calculated time-in-process exceeds the allowable end time based on the obtained Q-time and determine the current process timing to be the start timing of starting the processes of the wafers included in the CJ when it is determined that the predicted end time does not exceed the allowable end time based on the obtained Q-time.

As described above, the substrate processing device 120 refers to the PM usage state when obtaining the CJ and starts the processes of the wafers included in the CJ at a timing when the predicted end time when the wafers included in the CJ have been processed does not exceed the allowable end time based on the Q-time. Thus, according to the substrate processing device 120, it is possible to avoid a situation in which the processing starts even though the number of PMs that can be used is small and the time-in-process increases, and it is possible to achieve the OR transfer satisfying the condition specified to achieve product quality.

Second Embodiment

In the first embodiment described above, the predicted end time based on the time-in-process is calculated, the allowable end time based on the Q-time is calculated, and both are compared. However, a target to be compared may not be the predicted end time and the allowable end time, and the time-in-process and the Q-time may be directly compared.

In the first embodiment described above, the case in which the start determining unit 133 predicts the predicted end time by assigning the processes of the wafers included in the CJ by using the current process timing as the start timing has been described. However, the start determining unit 133 may predict the predicted end time by assigning the processes of the wafers included in the CJ by using any timing after the current process timing as the start timing. In this case, the start determining unit 133 calculates the allowable end time based on the Q-time, based on the timing after the current process timing.

In the first embodiment described above, the description assumes that the job generator 111 is achieved in the management device 110. However, for example, the job generator 111 may be achieved in the substrate processing device 120. In the first embodiment described above, the reception determining unit 131, the order determining unit 132, and the start determining unit 133 are achieved in the control device 130 inside the substrate processing device 120. However, for example, the reception determining unit 131 and the order determining unit 132 may not be achieved in the control device 130 inside the substrate processing device 120 or may be achieved in another device.

It should be noted that the present invention is not limited to the above-described configurations, such as the configurations described in the above-described embodiments, and such as combinations with another element. These points can be modified without departing from the scope of the invention, and can be appropriately determined in accordance with the application form.

This application is based on and claims priority to Japanese Patent Application No. 2018-126903 filed on Jul. 3, 2018, the entire contents of which are incorporated herein by reference.

DESCRIPTION OF REFERENCE SYMBOLS

100: substrate processing system
110: management device
111: job generator
120: substrate processing device
130: control device
131: reception determining unit
132: order determining unit
133: start determining unit
510, 520: CJ 521 to 524: PJ
700: CJ
701, 702: schedule
810: CJ
811: PJ
820, 830: schedule

What is claimed is:

1. A substrate processing device comprising:
a transfer arm;
a plurality of process modules;
a memory; and
a processor coupled with the memory and configured to:
refer to usage states of the plurality of process modules at process time slots to identify one or more process modules that can execute processes of substrates included in a control job to be processed among process modules that can be used at the process time slots;
assign the processes of the substrates to respective process time slots of the identified one or more process modules to calculate a time duration from a start to an end of the processes of the substrates; and
determine a start timing of starting the processes of the substrates so that the calculated time duration satisfies a specified condition,
wherein the transfer arm transfers the substrates to the identified one or more process modules based on the determined start timing.

2. The substrate processing device as claimed in claim 1, wherein the processor determines the start timing so that the calculated time duration does not exceed a Q-time specified to the control job.

3. The substrate processing device as claimed in claim 1, wherein the processor determines whether a number of the identified one or more process modules increases when the calculated time duration does not satisfy the specified condition, the time duration being from the start to the end of the processes of the substrates when a current process timing is used as the start timing, and
wherein when the processor has determined that the number of process modules has increased, the processor calculates a time duration from the start to the end of the processes of the substrates when a process timing after the processor has determined that the number of process modules has increased is used as the start timing.

4. The substrate processing device as claimed in claim 1, wherein the processor is further configured to reorder a plurality of process jobs to determine execution order of the plurality of process jobs, in the control job to be processed that includes the plurality of process jobs,
wherein the processor assigns the processes of the substrates included in the plurality of process jobs to the respective process time slots of the identified one or more process modules according to the determined execution order to calculate a time duration from the start to the end of the processes of the substrates included in the plurality of process jobs.

5. The substrate processing device as claimed in claim 4, wherein the processor reorders the plurality of process jobs in order from a smallest number of process modules that can be executed in parallel, and when there are process jobs having a same number of process modules that can be executed in parallel, the processor reorders the process jobs in order from a largest number of substrates, and when there are process jobs having the same number of process modules that can be executed in parallel and having a same number of substrates, the processor reorders the process jobs in generating order of the process jobs to determine the execution order of the plurality of process jobs.

6. The substrate processing device as claimed in claim 1, wherein the processor is further configured to compare the time duration from the start to the end of the processes of the substrates with the specified condition to determine whether the control job to be processed can be received, the time duration from the start to the end of the processes of the substrates being calculated by assigning the processes of the substrates to the respective process time slots of all process modules that can execute the processes of the substrates included in the control job to be processed.

7. The substrate processing device as claimed in claim 6, wherein the processor determines that the control job to be processed cannot be received when determining that the specified condition is not satisfied, and determines that the control job to be processed can be received when determining that the specified condition is satisfied.

8. A determination method performed by a substrate processing device including a transfer arm, a plurality of process modules, a memory_ and a processor coupled with the memory, the determination method comprising:
referring to usage states of the plurality of process modules at process time slots to identify one or more process modules that can execute processes of substrates included in a control job to be processed among process modules that can be used at the process time slots;
assigning the processes of the substrates to respective process time slots of the identified one or more process modules to calculate a time duration from a start to an end of the processes of the substrates; and
determining a start timing of starting the processes of the substrates so that the calculated time duration satisfies a specified condition,
wherein the transfer arm transfers the substrates to the identified one or more process modules based on the determined start timing.

* * * * *